United States Patent
Qin et al.

(10) Patent No.: US 11,615,415 B2
(45) Date of Patent: Mar. 28, 2023

(54) SERVICE DISPLAYING METHOD AND TERMINAL

(71) Applicant: ADVANCED NEW TECHNOLOGIES CO., LTD., Grand Cayman (KY)

(72) Inventors: Yao Qin, Hangzhou (CN); Jiasong Han, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 277 days.

(21) Appl. No.: 16/266,816

(22) Filed: Feb. 4, 2019

(65) Prior Publication Data

US 2019/0172063 A1 Jun. 6, 2019

Related U.S. Application Data

(63) Continuation of application No. PCT/CN2017/094010, filed on Jul. 24, 2017.

(30) Foreign Application Priority Data

Aug. 5, 2016 (CN) .......................... 201610641416.0

(51) Int. Cl.
| | |
|---|---|
| *G06Q 20/40* | (2012.01) |
| *G06F 16/00* | (2019.01) |
| *G06F 16/958* | (2019.01) |
| *G06Q 30/04* | (2012.01) |

(52) U.S. Cl.
CPC ........... *G06Q 20/401* (2013.01); *G06F 16/00* (2019.01); *G06F 16/972* (2019.01); *G06Q 30/04* (2013.01)

(58) Field of Classification Search
CPC .... G06Q 20/401; G06Q 30/04; G06F 16/972; G06F 16/00
USPC .............................................. 705/0.35, 14.17
See application file for complete search history.

(56) References Cited

U.S. PATENT DOCUMENTS

| | | | |
|---|---|---|---|
| 5,261,069 A | 11/1993 | Wilkinson et al. | |
| 5,826,253 A | 10/1998 | Bredenberg | |
| 5,924,078 A | 7/1999 | Naftzger | |
| 6,532,448 B1 * | 3/2003 | Higginson | ......... G06Q 30/0236 705/14.39 |

(Continued)

FOREIGN PATENT DOCUMENTS

| | | |
|---|---|---|
| CN | 102446196 A | 5/2012 |
| CN | 101188627 B | 11/2012 |

(Continued)

OTHER PUBLICATIONS

Translation of WO-2018024122-A1 (Year: 2018).*

(Continued)

*Primary Examiner* — Christine M Behncke
*Assistant Examiner* — Pierre L Maccagno

(57) ABSTRACT

A transaction displaying method includes obtaining data associated with a transaction from a server, where the data includes data associated with one or more displaying groups and data associated with one or more displaying objects in each of the displaying groups. The method further includes, subsequent to the obtaining the data, detecting that the transaction is triggered, selecting, responsive to the detecting, a displaying group from the data, selecting a displaying object in the selected displaying group for display, and displaying the selected displaying object.

12 Claims, 8 Drawing Sheets

(56) References Cited

U.S. PATENT DOCUMENTS

| | | | |
|---|---|---|---|
| 6,567,818 B1 | 5/2003 | Frey et al. | |
| 6,578,068 B1 | 6/2003 | Bowman-amuah | |
| 6,594,671 B1 | 7/2003 | Aman et al. | |
| 6,636,242 B2 | 10/2003 | Bowman-amuah | |
| 6,640,244 B1 | 10/2003 | Bowman-amuah | |
| 6,842,906 B1 | 1/2005 | Bowman-amuah | |
| 7,003,587 B1 | 2/2006 | Battat et al. | |
| 7,289,964 B1 | 10/2007 | Bowman-amuah | |
| 7,688,327 B2 | 3/2010 | Robotham et al. | |
| 7,958,457 B1 * | 6/2011 | Brandenberg | G06N 7/005 |
| | | | 715/811 |
| 8,856,222 B2 | 10/2014 | McCanne et al. | |
| 11,232,671 B1 * | 1/2022 | Mahajan | G07F 17/32 |
| 2002/0099634 A1 | 7/2002 | Coutts et al. | |
| 2004/0088376 A1 | 5/2004 | McCanne et al. | |
| 2004/0215665 A1 | 10/2004 | Edgar et al. | |
| 2004/0215746 A1 | 10/2004 | McCanne et al. | |
| 2012/0077580 A1 * | 3/2012 | Mahajan | G07F 17/32 |
| | | | 463/43 |
| 2013/0060621 A1 | 3/2013 | Walker et al. | |
| 2013/0080588 A1 | 3/2013 | Ibasco et al. | |
| 2015/0112782 A1 * | 4/2015 | Nikolaev | G06Q 30/0215 |
| | | | 705/14.17 |
| 2015/0339730 A1 | 11/2015 | Endo et al. | |
| 2019/0172063 A1 * | 6/2019 | Qin | G06F 16/00 |
| 2021/0350370 A1 * | 11/2021 | Rohlfs | G06Q 30/0283 |

FOREIGN PATENT DOCUMENTS

| | | | | |
|---|---|---|---|---|
| CN | 104320546 A | | 1/2015 | |
| CN | 104346346 A | | 2/2015 | |
| CN | 104361415 A | | 2/2015 | |
| CN | 105045895 A | * | 11/2015 | G06F 17/30 |
| CN | 105045895 A | | 11/2015 | |
| CN | 105045896 A | | 11/2015 | |
| KR | 2002-0078145 A | | 10/2002 | |
| TW | I493492 B | | 7/2015 | |
| TW | I494778 B | | 8/2015 | |
| WO | WO-2018024122 A1 | * | 2/2018 | G06F 16/00 |

OTHER PUBLICATIONS

Written Opinion of the International Searching Authority and International Search Report for PCT Application No. PCT/CN2017/094010 dated Oct. 11, 2017 (11 pages).

International Preliminary Report on Patentability Chapter I for PCT Application No. PCT/CN2017/094010 dated Feb. 14, 2019 (9 pages).

Non-final rejection and Search Report for Taiwanese Application No. 106119493 dated Apr. 15, 2019 (6 pages).

Decision to reject for Taiwanese Application No. 106119493 dated Aug. 16, 2019 (4 pages).

First Office Action and First Search for Chinese Application No. 201610641416.0 dated Apr. 3, 2019 with English machine translation (9 pages).

Written Opinion for Singaporean Application No. 10202101238P dated Feb. 7, 2022.

Supplementary Search for Chinese Application No. 201610641416.0 dated Nov. 7, 2019 (1 page).

Second Office Action for Chinese Application No. 201610641416.0 dated Nov. 15, 2019 with English machine translation (8 pages).

* cited by examiner

SERVICE DISPLAYING METHOD AND TERMINAL

CROSS-REFERENCE TO RELATED APPLICATIONS

The present application is a continuation application of International Application No. PCT/CN2017/094010, filed on Jul. 24, 2017, which is based on and claims priority to and benefits of Chinese Patent Application No. 201610641416.0 filed with the State Intellectual Property Office (SIPO) of the People's Republic of China on Aug. 5, 2016. The entire contents of the above-identified applications are incorporated herein by reference.

TECHNICAL FIELD

This application relates to the field of computer technologies, and in particular, to a transaction displaying method and device.

BACKGROUND

With the development of the wireless network, the wireless network becomes one of primary manners for interactive transactions. For example, after a merchant deploys a transaction server, a terminal may communicate with the transaction server by using the wireless network, and after obtaining transaction data, the terminal displays the transaction data. Therefore, displaying of the transaction data plays an important role in the implementation results of a transaction.

A current transaction displaying method is that: each time the terminal detects that a transaction is triggered, the terminal requests transaction data from the transaction server, and after obtaining the transaction data returned by the transaction server, the terminal displays the transaction data.

In the foregoing method, each time the transaction is detected to be triggered, transaction data is requested from the transaction server. When a large number of terminals simultaneously request the transaction data in a short time, relatively high requirements are posed on a high-concurrency execution capability of the transaction server.

SUMMARY

To reduce relatively high requirements on a high-concurrency execution capability of a transaction server, embodiments of this application provide a transaction displaying method and terminal. To achieve the above objective, the specification provides the following technical solutions.

According to one aspect, an embodiment of this application provides a transaction displaying method, including: obtaining transaction data configured by a transaction server, where the transaction data includes at least one transaction displaying group, and any transaction displaying group includes at least one transaction displaying object; selecting a transaction displaying group from the transaction data when it is detected that a transaction is triggered; determining a transaction displaying object in the selected transaction displaying group; and displaying the determined transaction displaying object.

Optionally, the transaction data further includes group displaying probabilities of all the transaction displaying groups, a sum of the group displaying probabilities being 100%; and the selecting a transaction displaying group from the transaction data comprises: determining, based on the group displaying probabilities, a group interval corresponding to each of the transaction displaying groups in an interval [0, 100]; generating a first random number, where the first random number is a natural number in [1, 100]; and determining a group interval including the first random number, and selecting a transaction displaying group corresponding to the determined group interval.

Optionally, the transaction data further includes object displaying probabilities of all the transaction displaying objects, a sum of the object displaying probabilities in any transaction displaying group being 100%; and the determining a transaction displaying object in the selected transaction displaying group comprises: determining, based on the object displaying probabilities in the selected transaction displaying group, an object interval corresponding to each of the transaction displaying objects in the selected transaction displaying group in an interval [0, 100]; generating a second random number, where the second random number is a natural number in [1, 100]; and determining an object interval including the second random number, and selecting a transaction displaying object corresponding to the determined object interval.

Optionally, the transaction data further includes a group identifier of each transaction displaying group; and before the selecting a transaction displaying group from the transaction data, the method further includes: obtaining a group identifier and a group displaying update probability that are configured by the transaction server; and determining, in the transaction data, a transaction displaying group corresponding to the group identifier configured by the transaction server, and updating a displaying probability corresponding to the transaction displaying group to the group displaying update probability.

Optionally, the transaction data further includes an object identifier of each transaction displaying object; and before the determining a transaction displaying object in the selected transaction displaying group, the method further includes: obtaining an object identifier and an object displaying update probability that are configured by the transaction server; and determining, in the transaction data, a transaction displaying object corresponding to the object identifier configured by the transaction server, and updating an object displaying probability corresponding to the transaction displaying object to the object displaying update probability.

Optionally, the obtaining a group identifier and a group displaying update probability that are configured by the transaction server includes: obtaining a group identifier and a group displaying update probability in a message header of a first Hypertext Transfer Protocol (HTTP) message, where the first HTTP message is sent by a gateway, and the group identifier and the group displaying update probability are configured by the transaction server.

Optionally, the obtaining an object identifier and an object displaying update probability that are configured by the transaction server includes: obtaining an object identifier and an object displaying update probability in a message header of a second HTTP message, where the second HTTP message is sent by a gateway, and the object identifier and the object displaying update probability are configured by the transaction server.

According to another aspect, an embodiment of this application provides a terminal, including: a first obtaining module, configured to obtain transaction data configured by a transaction server, where the transaction data includes at least one transaction displaying group, and any transaction displaying group includes at least one transaction displaying object; a selecting module, configured to select a transaction displaying group from the transaction data obtained by the first obtaining module when it is detected that a transaction is triggered; a first determining module, configured to determine a transaction displaying object in the transaction displaying group selected by the selecting module; and a displaying module, configured to display the transaction displaying object determined by the first determining module.

Optionally, the transaction data further includes group displaying probabilities of all the transaction displaying groups, a sum of the group displaying probabilities being 100%; and the selecting module includes: a determining unit, configured to determine, based on the group displaying probabilities, a group interval corresponding to each of the transaction displaying groups in an interval [0, 100]; a generating unit, configured to generate a first random number, where the first random number is a natural number in [1, 100]; and a selecting unit, configured to determine a group interval including the first random number, and select a transaction displaying group corresponding to the determined group interval.

Optionally, the transaction data further includes object displaying probabilities of all the transaction displaying objects, a sum of the object displaying probabilities in any transaction displaying group being 100%; and the first determining module includes: a determining unit, configured to determine, based on the object displaying probabilities in the selected transaction displaying group, an object interval corresponding to each of the transaction displaying objects in the selected transaction displaying group in an interval [0, 100]; a generating unit, configured to generate a second random number, where the second random number is a natural number in [1, 100]; and a selecting unit, configured to determine an object interval including the second random number, and select a transaction displaying object corresponding to the determined object interval.

Optionally, the transaction data further includes a group identifier of each transaction displaying group; and the terminal further includes: a second obtaining module, configured to obtain a group identifier and a group displaying update probability that are configured by the transaction server; a second determining module, configured to determine, in the transaction data, a transaction displaying group corresponding to the group identifier that is configured by the transaction server and that is obtained by the second obtaining module; and a first updating module, configured to update a displaying probability corresponding to the transaction displaying group determined by the second determining module to the group displaying update probability.

Optionally, the transaction data further includes an object identifier of each transaction displaying object; and the terminal further includes: a third obtaining module, configured to obtain an object identifier and an object displaying update probability that are configured by the transaction server; a third determining module, configured to determine, in the transaction data, a transaction displaying object corresponding to the object identifier that is configured by the transaction server and that is obtained by the third obtaining module; and a second updating module, configured to update an object displaying probability corresponding to the transaction displaying object determined by the third determining module to the object displaying update probability.

Optionally, the second obtaining module is configured to obtain a group identifier and a group displaying update probability in a message header of a first Hypertext Transfer Protocol (HTTP) message; and the first HTTP message is sent by a gateway, and the group identifier and the group displaying update probability are configured by the transaction server.

Optionally, the third obtaining module is configured to obtain an object identifier and an object displaying update probability in a message header of a second HTTP message; and the second HTTP message is sent by a gateway, and the object identifier and the object displaying update probability are configured by the transaction server.

In a further aspect, the present application provides a transaction displaying method comprising obtaining data associated with a transaction from a server, wherein the data comprises data associated with one or more displaying groups, and data associated with one or more displaying objects in each of the displaying groups, subsequent to the obtaining the data, detecting that the transaction is triggered, selecting, responsive to the detecting, a displaying group from the data, selecting a displaying object in the selected displaying group for display, and displaying the selected displaying object.

In some embodiments, the data further comprises a group displaying probability associated with each of the one or more displaying groups. The selecting a displaying group from the data comprises determining a group interval corresponding to each of the one or more displaying groups based at least in part on the group displaying probability associated with the displaying group, generating a first random number, and determining that the first random number falls within the group interval corresponding to the selected displaying group.

In some embodiments, the data further comprises an object displaying probability associated with each of the one or more displaying objects in each displaying group. The selecting a displaying object in the selected displaying group comprises determining an object interval corresponding to each of the one or more displaying objects in the selected displaying group based at least in part on the object displaying probability associated with the displaying object, generating a second random number, and determining that the second random number falls within the object interval corresponding to the selected displaying object.

In some embodiments, the data further comprises a group identifier and a group displaying probability associated with each of the one or more displaying groups. The method further comprises, prior to the selecting a displaying group, obtaining a group identifier and a group displaying update probability from the server, identifying, from the one or more displaying groups, a displaying group that corresponds to the obtained group identifier, and updating the group displaying probability corresponding to the identified displaying group to be the group displaying update probability.

In some embodiments, the obtaining a group identifier and a group displaying update probability comprises receiving a message from a gateway, wherein the message comprises information associated with another transaction and obtaining the group identifier and the group displaying update probability from a header of the message.

In some embodiments, the data further comprises an object identifier and an object displaying probability associated with each of the displaying objects in each displaying group. The method further comprises, prior to the selecting a displaying object, obtaining an object identifier and an object displaying update probability from the server, identifying, from the one or more displaying objects in the selected displaying group, a displaying object corresponding to the object identifier, and updating the object displaying probability corresponding to the identified displaying object to be the object displaying update probability.

In some embodiments, the obtaining an object identifier and an object displaying update probability comprises receiving a message from a gateway, wherein the message comprises information associated with another transaction and obtaining the object identifier and the object displaying update probability from a header of the message.

In another aspect, the present application provides a non-transitory computer-readable storage medium configured with instructions executable by one or more processors to cause the one or more processors to perform operations comprising obtaining data associated with a transaction from a server, wherein the data comprises data associated with one or more displaying groups and data associated with one or more displaying objects in each of the displaying groups, subsequent to the obtaining the data, detecting that the transaction is triggered, selecting, responsive to the detecting, a displaying group from the data, selecting a displaying object in the selected displaying group for display, and displaying the selected displaying object.

In yet another aspect, the present application provides a system comprising a processor and a non-transitory computer-readable storage medium storing instructions executable by the processor to cause the system to perform operations comprising obtaining data associated with a transaction from a server, wherein the data comprises data associated with one or more displaying groups and data associated with one or more displaying objects in each of the displaying groups, subsequent to the obtaining the data, detecting that the transaction is triggered, selecting, responsive to the detecting, a displaying group from the data, selecting a displaying object in the selected displaying group for display, and displaying the selected displaying object.

Beneficial effects are as follows: the transaction data configured by the transaction server is obtained; a transaction displaying group is selected from the transaction data when it is detected that the transaction is triggered; a transaction displaying object is determined in the selected transaction displaying group; and the determined transaction displaying object is displayed, so that transaction displaying data is pre-obtained rather than obtained in a displaying process, a high-concurrency problem is not involved, and relatively high requirements on a high-concurrency execution capability of the transaction server are reduced.

BRIEF DESCRIPTION OF THE DRAWINGS

The specific embodiments of this application are described with reference to the following drawings, wherein.

DETAILED DESCRIPTION

To make the technical solutions and advantages of this application clearer, exemplary embodiments of this application are further described in detail below with reference to the accompanying drawings. Apparently, the described embodiments are merely some embodiments of this application, rather than exhaustive embodiments. Moreover, in case that no conflict occurs, the embodiments in this specification and the features in the embodiments may be combined.

Figure 1:
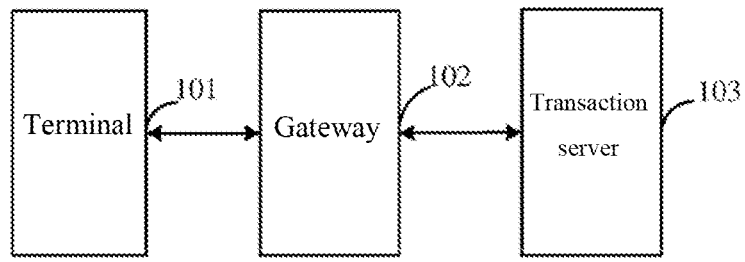
FIG. 1 is a schematic diagram of an implementation environment of a transaction displaying method according to an embodiment of this application.

FIG. 1 is a schematic diagram of an implementation environment of a transaction displaying method according to an embodiment of the specification. The implementation environment includes a terminal 101, a gateway 102, and a transaction server 103.

The terminal 101 may pre-obtain transaction data configured by the transaction server 103 by using the transaction displaying method provided in this embodiment of the specification. The transaction data includes at least one transaction displaying group, and any transaction displaying group includes at least one transaction displaying object. Here, a transaction displaying object may comprise a content object that may be displayed by a terminal or other suitable device or system to implement the transaction. A transaction displaying group may be comprise a group of such objects that may be displayed during implementation of the transaction. After detecting that a transaction is triggered, the terminal 101 selects a transaction displaying group from the pre-obtained transaction data, determines a transaction displaying object in the selected transaction displaying group, and displays the determined transaction displaying object.

The gateway 102 is configured to implement network interconnection between the terminal 101 and the transaction server 103.

The gateway may also be referred to as network gateway and a protocol converter. The gateway may implement network interconnection above the network layer, may be the most complex network interconnection device, and may be used for interconnection of networks using different high layer protocols. The gateway may be used for interconnection of wide area networks or local area networks. The gateway may be a computer system or device responsible for conversion. The gateway may be a translator device used between two different systems which use different communication protocols, data formats or languages, or even different system structures. A gateway may be different from a network bridge which may only conveys information. The gateway may re-pack received information to adapt to requirements of a destination system. Based on the feature that the gateway may re-pack the received information to adapt to the requirements of the destination system, after receiving a group identifier and a group displaying update probability that are configured by the transaction server 103, the gateway 102 adds the group identifier and the group displaying update probability to a message header of a first Hyper Text Transfer Protocol (HTTP) message, and sends the first HTTP message to the terminal 101, where the first HTTP message including the message header is related to a transaction of the terminal. After receiving an object identifier and an object displaying update probability that are configured by the transaction server 103, the gateway 102 adds the object identifier and the object displaying update probability to a message header of a second HTTP message, and sends the second HTTP message to the terminal 101, where the second HTTP message is related to a transaction of the terminal.

The transaction server 103 is configured to configure transaction data and push the transaction data to the terminal 101. After the transaction server 103 pushes the transaction data to the terminal 101, if the transaction server 103 obtains a group displaying update probability of a transaction displaying group, the transaction server 103 further sends the group identifier and the group displaying update probability of a transaction displaying group to the gateway 102, so that the gateway 102 adds the group identifier and the group displaying update probability to the message header of the first HTTP message, and sends the first HTTP message to the terminal 101. If the transaction server 103 obtains the object displaying update probability of a transaction displaying object, the transaction server 103 further sends the object displaying update probability of the transaction displaying object to the gateway 102, so that the gateway 102 adds the object displaying update probability of the transaction displaying object to the message header of the second HTTP message, and sends the second HTTP message to the terminal 101.

In consideration of the foregoing implementation environment, this embodiment provides a transaction displaying method. The method provided in this embodiment can be applied to various transactions, and especially to related transactions that have high concurrency, cause high pressures on the server, and have adjustable and controllable requirements on the implementation at the terminal, and can significantly reduce the pressure on the server and produce superb application results.

To describe the transaction displaying method provided in this embodiment more clearly and explicitly, the following specific scenario is used as an example in this embodiment. For other scenarios, refer to the implementation of the following scenario.

Specific scenario: Colored egg transaction in a prize hand-out system of the CCTV Spring Festival Gala activity. A colored egg may be a metaphor for a potential prize. A software application may provide a colored egg for display to a user. The user may interact with the colored egg to "smash" it to reveal a prize, if any, hidden inside.

Six types of candidate colored eggs are provided in the colored egg transaction, namely, colored eggs A1, colored eggs A2, colored eggs B1, colored eggs B2, and colored eggs B3.

Prizes in the colored eggs A1 and the colored eggs A2 are sponsored by a sponsor A. The prize in a colored egg A1 is a skincare commodity sponsored by the sponsor A, and the prize in a colored egg A2 is a make-up product sponsored by the sponsor A. Prizes in the colored eggs B1, the colored eggs B2, and the colored eggs B3 are sponsored by a sponsor B. The prize in a colored egg B1 is infant food sponsored by the sponsor B, the prize in a colored egg B2 is adult food sponsored by the sponsor B, and the prize in a colored egg B3 is seniors' food sponsored by the sponsor B.

Therefore, according to different sponsors, the candidate colored eggs in the colored egg transaction may be classified into two groups. A group A includes the colored eggs A1 and the colored eggs A2, and a group B includes the colored eggs B1, the colored eggs B2, and the colored eggs B3.

In the foregoing scenario, the transaction is the colored egg transaction, the transaction data is the colored egg transaction data, the transaction displaying groups are the group A and the group B, the transaction displaying objects are the colored eggs A1, the colored eggs A2, the colored eggs B1, the colored eggs B2, and the colored eggs B3. Specifically, the colored egg transaction data includes two transaction displaying groups (the group A and the group B), the group A includes two transaction displaying objects (the colored egg A1 and the colored egg A2), and the group B includes three transaction displaying objects (the colored egg B1, the colored egg B2, and the colored egg B3).

According to an existing transaction displaying method, after a preset interface of the prize hand-out system is opened, each time the terminal detects that the terminal is selected, the terminal 1) requests data of an egg smashing transaction from a colored egg transaction server, where the colored egg transaction data includes the group A and the group B, the group A includes the colored eggs A1 and the colored eggs A2, and the group B includes the colored eggs B1, the colored eggs B2, and the colored eggs B3; 2) selects the group A or the group B from the colored egg transaction data (for example, the group A); 3) determines a colored egg in the group A (for example, the colored egg A1); and 4) displays the colored egg A1.

The terminal may be selected in a plurality of ways. For example, after the terminal detects that a "Xiu Xiu" function on its current page is clicked, the terminal sends a selection request to a server corresponding to the "Xiu Xiu" function, so as to cause the server corresponding to the "Xiu Xiu" function to determine whether the terminal is selected. The "Xiu Xiu" function may correspond to a function that provides prizes, promotions, deals, or relevant people or businesses nearby. By clicking on the "Xiu Xiu" function, a user may be directed to a user interface that provides one or more colored eggs as well as one or more other items of interest. After the server corresponding to the "Xiu Xiu" function receives the selection request, the server determines, according to preset rules, whether the terminal is selected, and returns a determining result to the terminal, and the terminal receives the determining result. If the determining result is "selected", the terminal determines that the terminal has detected itself selected, or if the determining result is "unselected", the terminal determines that the terminal has not detected itself selected.

However, if data of a colored egg smashing transaction is requested from a colored egg smashing transaction server each time, and a colored egg is displayed according to the obtained data of the colored egg smashing transaction, a large quantity of server resources are wasted. Especially when the terminal frequently requests the data of the colored egg smashing transaction during the activity, the colored egg smashing transaction server may not respond in time, with a result that the terminal cannot display the colored egg in time.

Figure 2:
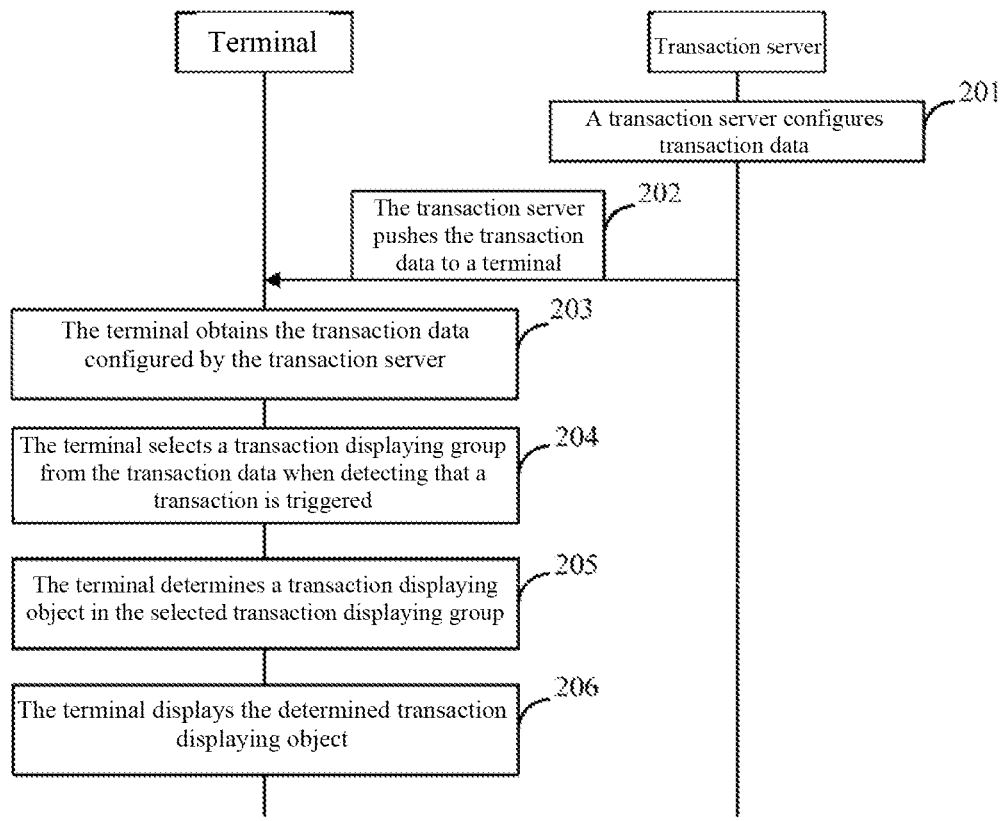
FIG. 2 is a schematic flowchart of a transaction displaying method according to another embodiment of this application.

To resolve the foregoing problem, FIG. 2 shows a transaction displaying method that has the following steps.

201: The transaction server configures transaction data.

The transaction data includes at least one transaction displaying group, and any transaction displaying group includes at least one transaction displaying object.

In the scenario of the colored egg transaction of the prize hand-out system of the CCTV Spring Festival Gala activity, when step 201 is performed, the colored egg transaction server configures the colored egg transaction data. As shown in Table 1, the colored egg transaction data includes the group A and the group B, the group A includes the colored egg A1 and the colored egg A2, and the group B includes the colored egg B1, the colored egg B2, and the colored egg B3.

TABLE 1

| Transaction displaying group | Transaction displaying object |
| --- | --- |
| Group A | Colored egg A1 |
|  | Colored egg A2 |
| Group B | Colored egg B1 |
|  | Colored egg B2 |
|  | Colored egg B3 |

In addition to the transaction displaying groups and the transaction displaying objects included in the transaction displaying groups, the transaction data further includes: group displaying probabilities of the transaction displaying groups, object displaying probabilities of the transaction displaying objects, group identifiers of the transaction displaying groups, and object identifiers of the transaction displaying objects. Here, a group displaying probability associated with a transaction displaying group may be a probability for which an object from the transaction displaying group is selected for display when objects from a number of transaction displaying groups can potentially be selected. An object displaying probability associated with a transaction displaying object may be a probability for which the transaction displaying object is selected for display when objects from the same transaction displaying group can potentially be displayed. A group identifier of a transaction displaying group may comprise an identifier that uniquely identifies the transaction displaying group among one or more other transaction displaying groups. An object identifier of a transaction displaying object may comprise an identifier that uniquely identifies the transaction displaying object among one or more other transaction displaying objects.

A sum of the group displaying probabilities is 100%, and a sum of the object displaying probabilities in any transaction displaying group is 100%.

For the scenario of the colored egg transaction of the prize hand-out system of the CCTV Spring Festival Gala activity, as shown in Table 2, the colored egg transaction data may include: 1) the group A and the group B, where the group A includes the colored egg A1 and the colored egg A2, and the group B includes the colored egg B1, the colored egg B2, and the colored egg B3; 2) a group A identifier, a group B identifier, a colored egg A1 identifier, a colored egg A2 identifier, a colored egg B1 identifier, a colored egg B2 identifier, and a colored egg B3 identifier; and 3) a group A displaying probability, a group B displaying probability, a colored egg A1 displaying probability, a colored egg A2 displaying probability, a colored egg B1 displaying probability, a colored egg B2 displaying probability, and a colored egg B3 displaying probability.

TABLE 2

| Transaction displaying group | Group identifier | Group displaying probability | Transaction displaying object | Object identifier | Object displaying probability |
| --- | --- | --- | --- | --- | --- |
| Group A | IDA | 50% | Colored egg A1 | A1 | 50% |
|  |  |  | Colored egg A2 | A2 | 50% |
| Group B | IDB | 50% | Colored egg B1 | B1 | 50% |
|  |  |  | Colored egg B2 | B2 | 25% |
|  |  |  | Colored egg B3 | B3 | 25% |

In addition, the transaction data may further include displaying states of the transaction displaying objects and displaying content corresponding to the displaying states.

For the scenario of the colored egg transaction of the prize hand-out system of the CCTV Spring Festival Gala activity, as shown in Table 3, the colored egg transaction data may include: 1) the group A and the group B, where the group A includes the colored egg A1 and the colored egg A2, and the group B includes the colored egg B1, the colored egg B2, and the colored egg B3; 2) the group A identifier, the group B identifier, the colored egg A1 identifier, the colored egg A2 identifier, the colored egg B1 identifier, the colored egg B2 identifier, and the colored egg B3 identifier; 3) the group A displaying probability, the group B displaying probability, the colored egg A1 displaying probability, the colored egg A2 displaying probability, the colored egg B1 displaying probability, the colored egg B2 displaying probability, and the colored egg B3 displaying probability; 4) each colored egg includes a complete egg state, an egg-broken and prize-won state, and an egg-broken and prize-missed state; 5) displaying content of the colored egg A1 in the complete egg state, displaying content of the colored egg A1 in the egg-broken and prize-won state, displaying content of the colored egg A1 in the egg-broken and prize-missed state, displaying content of the colored egg A2 in the complete egg state, displaying content of the colored egg A2 in the egg-broken and prize-won state, displaying content of the colored egg A2 in the egg-broken and prize-missed state, displaying content of the colored egg B1 in the complete egg state, displaying content of the colored egg B1 in the egg-broken and prize-won state, displaying content of the colored egg B1 in the egg-broken and prize-missed state, displaying content of the colored egg B2 in the complete egg state, displaying content of the colored egg B2 in the egg-broken and prize-won state, displaying content of the colored egg B2 in the egg-broken and prize-missed state, displaying content of the colored egg B3 in the complete egg state, displaying content of the colored egg B3 in the egg-broken and prize-won state, and displaying content of the colored egg B3 in the egg-broken and prize-missed state.

a connection between the transaction server and the terminal may be established by using a gateway, and the gateway pushes the transaction data to the terminal.

The method provided in this embodiment is described in detail by using an example in which the connection between the transaction server and the terminal is established by using the gateway. A direct communication mode can be

TABLE 3

| Transaction displaying group | Group identifier | Group displaying probability | Transaction displaying object | Object identifier | Object displaying probability | Displaying content in a complete egg state | Displaying content in an egg-broken and prize-won state | Displaying content in an egg-broken and prize-missed state |
|---|---|---|---|---|---|---|---|---|
| Group A | IDA | 50% | Colored egg A1 | A1 | 50% | Picture C0 | Skincare commodity picture C1 | Picture C2 |
|  |  |  | Colored egg A2 | A2 | 50% | Picture C0 | Make-up product picture C1 | Picture C2 |
| Group B | IDB | 50% | Colored egg B1 | B1 | 50% | Cartoon D0 | Infant food picture D1 | Cartoon D2 |
|  |  |  | Colored egg B2 | B2 | 25% | Cartoon D0 | Adult food picture D1 | Cartoon D2 |
|  |  |  | Colored egg B3 | B3 | 25% | Cartoon D0 | Seniors' food picture D1 | Cartoon D2 |

Specific displaying forms of the displaying content of each colored egg in the complete egg state, the displaying content of each colored egg in the egg-broken and prize-won state, and the displaying content of each colored egg in the egg-broken and prize-missed state are described only by using the examples of the cartoons and the pictures shown in Table 3, and the displaying forms may be text or other forms during actual application. In addition, no relationship exists between the displaying content of each colored egg in the complete egg state, the displaying content of each colored egg in the egg-broken and prize-won state, and the displaying content of each colored egg in the egg-broken and prize-missed state. That is, if the displaying content of the colored egg in the complete egg state is displayed in a picture form, the displaying form of the displaying content of the colored egg in the egg-broken and prize-won state may be other forms such as a picture, a cartoon, or text, and the displaying form of the displaying content of the colored egg in the egg-broken and prize-missed state may also be other forms such as a picture, a cartoon, or text.

202: The transaction server pushes the transaction data to a terminal.

In this step, the transaction server pushes the transaction data configured in step 201 to the terminal. Pushing manners of the transaction data include but are not limited to the following two manners:

First pushing manner: the transaction server passively pushes the transaction data.

If the terminal sends a transaction data obtaining request to the transaction server, after the transaction server receives the transaction data obtaining request sent by the terminal, the transaction server pushes the transaction data to the terminal.

Second pushing manner: the transaction server actively pushes the transaction data.

After performing step 201 and finishing configuring the transaction data, the transaction server actively performs step 202 and pushes the transaction data to the terminal.

No matter which pushing manner is used, the transaction server may directly establish a connection with the terminal, and push the transaction data to the terminal. Alternatively, easily achieved by establishing a direct connection between the transaction server and the terminal, and is not described in detail.

203: The terminal obtains the transaction data configured by the transaction server.

The transaction data includes at least one transaction displaying group, and any transaction displaying group includes at least one transaction displaying object. In addition to the transaction displaying groups and the transaction displaying objects included in the transaction displaying groups, the transaction data further includes: group displaying probabilities of the transaction displaying groups, object displaying probabilities of the transaction displaying objects, group identifiers of the transaction displaying groups, and object identifiers of the transaction displaying objects. In addition, the transaction data may further include displaying states of the transaction displaying objects and displaying content corresponding to the displaying states.

A sum of the group displaying probabilities is 100%, and a sum of the object displaying probabilities in any transaction displaying group is 100%.

In step 202, there are two manners in which the transaction server may push the transaction data to the terminal, and therefore, in this step, there are also two manners in which the terminal may obtain the transaction data configured by the transaction server.

First obtaining manner: the terminal actively obtains the transaction data.

After sending a transaction data obtaining request to the transaction server, the terminal receives the transaction data returned by the transaction server.

Second obtaining manner: the terminal passively obtains the transaction data.

After the terminal detects the transaction data that is actively pushed by the transaction server, the terminal obtains the transaction data.

Through step 201 to step 203, the transaction data is obtained by the terminal, and in this case, the transaction corresponding to the transaction data has not been triggered, that is, the transaction data is obtained by the terminal before the transaction is triggered. When the transaction is triggered, the transaction data related to the transaction is pre-obtained in step 201 to step 203, and no more transaction data is obtained, so that obtaining of the transaction data does not involve a concurrent-execution problem of the transaction server when the transaction is executed, thereby avoiding relatively high requirements on the high-concurrency execution capability of the transaction server when the transaction is executed.

In addition, the terminal may fail to obtain the transaction data, and therefore, if detecting that no transaction data is obtained, the terminal re-obtains the transaction data. Because the transaction data has a very small data volume, the transaction server can support obtaining of the transaction data by a plurality of terminals at the same time.

In addition, during actual application, after step 201 to step 203 are performed and the transaction server pushes the transaction data to the terminal, the pushed transaction data may change as actual circumstances change, for example, the group displaying probability changes, the object displaying probability changes, the displaying state of the transaction displaying object changes, and the displaying content corresponding to the displaying state changes.

Cases in which the group displaying probability changes and the object displaying probability changes are respectively described below. For other cases related to content changes, refer to the cases in which the group displaying probability changes or the object displaying probability changes.

The case in which a group displaying probability changes may be processed with the following steps:

Step 1.1: When a group displaying update probability of a transaction displaying group is obtained, send a group identifier and the group displaying update probability of the transaction displaying group to a gateway. Here, a group displaying update probability of a transaction displaying group may comprise an updated value of the group displaying probability of the transaction displaying group.

In the scenario of the colored egg transaction of the prize hand-out system of the CCTV Spring Festival Gala activity, if an obtained group displaying update probability of the group A is 75%, a group displaying update probability of the group B is 25%.

Step 1.2: The gateway receives the group identifier and the group displaying update probability that are configured by the transaction server.

Step 1.3: The gateway determines a first message related to a transaction of the terminal.

In the scenario of the colored egg transaction of the prize hand-out system of the CCTV Spring Festival Gala activity, a degree of relevancy is not limited herein as long as the first message determined by the gateway is related to the colored egg transaction of the prize hand-out system of the terminal. For example, a message of an identity verification transaction of the prize hand-out system is not a message of the colored egg transaction, but is related to the colored egg transaction.

Step 1.4: The gateway adds the group identifier and the group displaying update probability to a message header of the first message.

The first message may be an HTTP message. For example, the first HTTP message is an HTTP response message.

Since the gateway may re-pack the received information to adapt to requirements of a destination system, the gateway may add the group identifier and the group displaying update probability to the message header of the first message.

In the scenario of the colored egg transaction of the prize hand-out system of the CCTV Spring Festival Gala activity, the gateway adds (IDA, 75%) and (IDB, 25%) to the message header of the HTTP response message.

In this embodiment, the group identifier and the group displaying update probability are added to the message header in a form of (group identifier, group displaying update probability), or may be added to the message header in other forms during actual application. A specific form is not limited in this embodiment.

Step 1.5: The gateway sends the first message to the terminal.

Step 1.6: The terminal obtains, via the gateway, the group identifier and the group displaying update probability that are configured by the transaction server.

A specific implementation of step 1.6 includes but is not limited to: when it is determined that the message header of the received first message includes a group identifier and a group displaying update probability, obtaining the group identifier and the group displaying update probability in the message header.

The first message is sent by the gateway, and the group identifier and the group displaying update probability are configured by the transaction server.

Step 1.7: Determine, in the transaction data, a transaction displaying group corresponding to the group identifier configured by the transaction server.

Step 1.8: Update a displaying probability corresponding to the transaction displaying group to the group displaying update probability.

In the scenario of the colored egg transaction of the prize hand-out system of the CCTV Spring Festival Gala activity, after step 1.1 to step 1.8 are performed, the transaction data at the terminal changes from Table 3 to Table 4:

TABLE 4

| Transaction displaying group | Group identifier | Group displaying probability | Transaction displaying object | Object identifier | Object displaying probability | Displaying content in a complete egg state | Displaying content in an egg-broken and prize-won state | Displaying content in an egg-broken and prize-missed state |
|---|---|---|---|---|---|---|---|---|
| Group A | IDA | 75% | Colored egg A1 | A1 | 50% | Picture C0 | Skincare commodity picture C1 | Picture C2 |
| | | | Colored egg A2 | A2 | 50% | Picture C0 | Make-up product picture C1 | Picture C2 |
| Group B | IDB | 25% | Colored egg B1 | B1 | 50% | Cartoon D0 | Infant food picture D1 | Cartoon D2 |
| | | | Colored egg B2 | B2 | 25% | Cartoon D0 | Adult food picture D1 | Cartoon D2 |
| | | | Colored egg B3 | B3 | 25% | Cartoon D0 | Seniors' food picture D1 | Cartoon D2 |

The case in which an object displaying probability changes may be processed with the following steps:

Step 2.1: When an object displaying update probability of a transaction displaying object is obtained, send the object displaying update probability of the transaction displaying object to a gateway. Here, an object displaying update probability of a transaction displaying object may comprise an updated value of the object displaying probability of the transaction displaying object.

In the scenario of the colored egg transaction of the prize hand-out system of the CCTV Spring Festival Gala activity, if an obtained object displaying update probability of the colored egg A1 is 75%, an object displaying update probability of the colored egg A2 is 25%.

Step 2.2: The gateway receives the object displaying update probability of the transaction displaying object configured by the transaction server.

Step 2.3: The gateway determines a second message related to a transaction of the terminal.

The second message may be an HTTP message, for example, the second HTTP message is an HTTP response message.

Step 2.4: The gateway adds the object displaying update probability of the transaction displaying object to a message header of the second message.

Step 2.5: The gateway sends the second message to the terminal.

Step 2.6: The terminal obtains the object displaying update probability of the transaction displaying object via the gateway.

A specific implementation of step 2.6 includes but is not limited to: when it is determined that the message header of the received second message includes the object displaying update probability of the transaction displaying object, obtaining the object displaying update probability of the transaction displaying object in the message header.

The second message is sent by the gateway, and the object displaying update probability of the transaction displaying object is configured by the transaction server.

Step 2.7: Determine, in transaction data, a transaction displaying object corresponding to an object identifier configured by the transaction server.

Step 2.8: Update an object displaying probability corresponding to the transaction displaying object to the object displaying update probability.

In the scenario of the colored egg transaction of the prize hand-out system of the CCTV Spring Festival Gala activity, after step 2.1 to step 2.8 are performed, the transaction data at the terminal changes from Table 4 to Table 5:

The group displaying probability and the object displaying probability may change at the same time or respectively at different time. The first message in the case in which the group displaying probability changes and the second message in the case in which the object displaying probability changes may be a same message or different messages.

If the group displaying probability and the object displaying probability change at the same time, the first message and the second message may be a same message or different messages.

If the group displaying probability and the object displaying probability change at different time, the first message and the second message are different messages.

In addition, after step 1.1 to step 1.8 or step 2.1 to step 2.8 are performed, the transaction server may modify the transaction data once pushed to the terminal.

In this modification process, the modified data is only the group identifier and the group displaying update probability of the transaction displaying group, and/or the object identifier and the object displaying update probability of the transaction displaying object. Compared with the transaction data pushed in step 202, the modified data has a small data volume and causes a relatively small pressure on the transaction server when being sent separately, and the transaction server usually can stand the pressure.

In addition, in the method provided in this embodiment, not only the modified data has a small data volume, but also the modified data is pushed to the terminal together with a message in a message header. The message to which the modified data is added is a common message that needs to be sent to the terminal regardless. Therefore, in the method provided in this embodiment, sending of the modified data occupies no separate traffic, and causes no pressure on the transaction server even in a high-concurrency scenario.

For the scenario of the colored egg transaction of the prize hand-out system of the CCTV Spring Festival Gala activity, according to the method provided in this embodiment, the colored egg transaction data is pushed to the terminal in advance in step 201 to step 203, and when an excessively large pressure is caused because the colored egg transaction server responds to a large number of requests, the colored egg transaction can be implemented by merely sending the modified data such as probabilities in the message headers of HTTP messages to the terminal, so as to avoid pressure caused to the colored egg transaction server in case the colored egg transaction data is re-obtained after the colored egg transaction is triggered. The terminal modifies the pre-obtained colored egg transaction data by using the modified data in the message header; this ensures that the

TABLE 5

| Transaction displaying group | Group identifier | Group displaying probability | Transaction displaying object | Object identifier | Object displaying probability | Displaying content in a complete egg state | Displaying content in an egg-broken and prize-won state | Displaying content in an egg-broken and prize-missed state |
|---|---|---|---|---|---|---|---|---|
| Group A | IDA | 75% | Colored egg A1 | A1 | 75% | Picture C0 | Skincare commodity picture C1 | Picture C2 |
|  |  |  | Colored egg A2 | A2 | 25% | Picture C0 | Make-up product picture C1 | Picture C2 |
| Group B | IDB | 25% | Colored egg B1 | B1 | 50% | Cartoon D0 | Infant food picture D1 | Cartoon D2 |
|  |  |  | Colored egg B2 | B2 | 25% | Cartoon D0 | Adult food picture D1 | Cartoon D2 |
|  |  |  | Colored egg B3 | B3 | 25% | Cartoon D0 | Aged persons' food picture D1 | Cartoon D2 | implementation results of the colored egg transaction is the same as that instructed by the colored egg transaction server. This not only allows the colored egg transaction server to control the implementation results of the colored egg transaction at the terminal, but also resolves a pressure problem of the colored egg transaction server.

204: Select a transaction displaying group from the transaction data when the terminal detects that a transaction is triggered.

Here, the transaction can be triggered in a plurality of manners. The manners include but are not limited to: considering that the transaction is triggered when a preset interface is opened, or considering that the transaction is triggered when receiving an indication that the terminal is selected by a "Xiu Xiu" function server after a "Xiu Xiu" function on a current interface of the terminal is triggered.

A specific implementation of selecting a transaction displaying group from the transaction data includes but is not limited to: determining, based on the group displaying probabilities, a group interval corresponding to each of the transaction displaying groups in an interval [0, 100]; generating a first random number; determining a group interval that includes the first random number, and selecting a transaction displaying group corresponding to the determined group interval. A group interval corresponding to a transaction displaying group may comprise a interval or a set of numbers corresponding to a transaction displaying group. The group intervals of multiple transaction displaying groups may be non-overlapping and may congregate to a global interval or space (e.g., [1, 100]). The group interval may be any suitable interval of numbers.

The first random number is a natural number in [1, 100]. The first random number may be selected from a suitable interval of numbers (e.g., [1, 100]). In particular embodiments, the interval of numbers may comprise a union of all relevant group intervals.

The transaction data is the transaction data that is pre-obtained by the terminal and that is configured by the transaction server, and the transaction data herein is latest transaction data.

For the scenario of the colored egg transaction of the prize hand-out system of the CCTV Spring Festival Gala activity, if the colored egg transaction data is shown in Table 5, it may be learned that a group displaying probability of the group A is 75%, and a group displaying probability of the group B is 25%. According to the group displaying probabilities of the group A and the group B, it is determined that a group interval corresponding to the group A in the interval [0, 100] is [0, 75], and a group interval corresponding to the group B in the interval [0, 100] is (75,100]. Refer to Table 6 for details. If a generated first random number is 65, the group interval that includes 65 is [0,75], and the group A, which corresponds to the interval [0,75], is selected.

TABLE 6

| Transaction displaying group | Group identifier | Group displaying probability | Group interval |
|---|---|---|---|
| Group A | IDA | 75% | [0, 75] |
| Group B | IDB | 25% | (75, 100] |

The open interval and closed interval in Table 6 are only used as examples, and are limited according to specific cases during actual application.

It should be noted that, to control a selection result of a transaction displaying group of the terminal more flexibly, in this step, after the terminal detects that the transaction is triggered, the terminal may further request current group displaying probabilities of the transaction displaying groups from the transaction server, updates the group displaying probabilities in the transaction data obtained in step 203 to the current group displaying probabilities returned by the transaction server, and selects a transaction displaying group from the transaction data according to the latest group displaying probability. Therefore, a technical effect that even if the transaction data is preset in the terminal, the group displaying probability of the transaction displaying group can still be controlled is achieved.

A manner of returning the current group displaying probabilities of the transaction displaying groups by the transaction server can still be that: the transaction server sends group identifiers of the transaction displaying groups and the corresponding current group displaying probabilities to the gateway, and the gateway adds the group identifiers of the transaction displaying groups and the corresponding current group displaying probabilities to a message header of a message and sends the message to the terminal.

205: The terminal determines a transaction displaying object in the selected transaction displaying group.

A specific implementation of the determining a transaction displaying object in the selected transaction displaying group includes but is not limited to: determining, based on the object displaying probabilities in the selected transaction displaying group, an object interval corresponding to each of the transaction displaying objects in the selected transaction displaying group in an interval [0, 100]; generating a second random number; and determining an object interval that includes the second random number, and selecting a transaction displaying object corresponding to the determined object interval. An object interval corresponding to a transaction displaying object may comprise a interval or a set of numbers corresponding to a transaction displaying object. The object intervals of multiple transaction displaying objects in a same transaction displaying group may be non-overlapping and may congregate to a global interval or space (e.g., [1, 100]). The group interval may be any suitable interval of numbers.

The second random number is a natural number in [1, 100]. The second random number may be selected from a suitable interval of numbers (e.g., [1, 100]). In particular embodiments, the interval of numbers may comprise a union of all relevant group intervals.

For the scenario of the colored egg transaction of the prize hand-out system of the CCTV Spring Festival Gala activity, if the group A is selected from the transaction data in step 204 and the colored egg transaction data is shown in Table 5, it may be learned that an object displaying probability of the colored egg A1 is 75%, and an object displaying probability of the colored egg A2 is 25%. According to the object displaying probabilities of the colored egg A1 and the colored egg A2, it is determined that a group interval corresponding to the colored egg A1 in the interval [0, 100] is [0, 75], and a group interval corresponding to the colored egg A2 in the interval [0, 100] is (75, 100]. Refer to Table 7 for details. If a generated first random number is 95, a group interval including 95 is (75, 100], and the colored egg A2 corresponding to the interval (75, 100] is determined.

TABLE 7

| Transaction displaying object | Object identifier | Object displaying probability | Object interval |
| --- | --- | --- | --- |
| Colored egg A1 | A1 | 75% | [0, 75] |
| Colored egg A2 | A2 | 25% | (75, 100] |

It should be noted that, to control a selection result of the transaction displaying object of the terminal more flexibly, after a transaction displaying group is selected from the transaction data in step 204, before a transaction displaying object is determined in the selected transaction displaying group in this step, current object displaying probabilities of the transaction displaying objects in the transaction displaying group that is selected in step 204 is requested from the transaction server, object displaying probabilities corresponding to the transaction displaying objects in the transaction data obtained in step 203 are updated to the current object displaying probabilities returned by the transaction server, and a transaction displaying object is determined in the transaction displaying group selected in step 204 according to the latest object displaying probabilities. Therefore, a technical effect that even if the transaction data is preset in the terminal, the object displaying probabilities of the transaction displaying objects can still be controlled is achieved.

A manner of returning the current object displaying probabilities of the transaction displaying objects by the transaction server can still be that: the transaction server sends object identifiers of the transaction displaying objects and the corresponding current object displaying probabilities to the gateway, and the gateway adds the object identifiers of the transaction displaying objects and the corresponding current object displaying probabilities to a message header of a message and sends the message to the terminal.

206: The terminal displays the determined transaction displaying object.

In the scenario of the colored egg transaction of the prize hand-out system in the CCTV Spring Festival Gala activity, if the transaction data is shown in Table 5 and it is determined in step 205 that the transaction displaying object is the colored egg A2, the terminal displays a picture C0 according to Table 5.

After the picture C0 is displayed, if a triggering event that the colored egg A2 is smashed is detected and if the colored egg A2 wins a prize, the terminal displays a make-up product picture C1, and if the colored egg A2 does not win a prize, the terminal displays a picture C2.

To illustrate differences between the method provided in this embodiment and the existing method, the existing method and the method provided in this embodiment are respectively described below for a high-concurrency environment.

Figure 3:
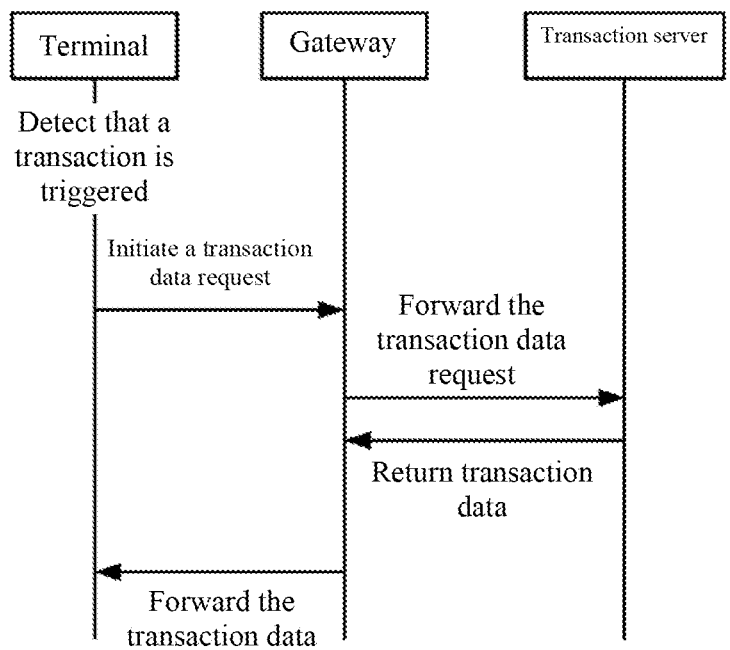
FIG. 3 is a schematic flowchart of an existing transaction displaying method according to another embodiment of this application.

FIG. 3 shows an existing transaction displaying method. In the method:

3.1: A terminal detects that a transaction is triggered.
3.2: The terminal initiates a transaction data request to a gateway.
3.3: The gateway forwards the transaction data request to a transaction server to request transaction data.
3.4: The transaction server returns the transaction data to the gateway.
3.5: The gateway forwards the transaction data to the terminal.

According to the method shown in FIG. 3, after detecting that the transaction is triggered, the terminal obtains all the transaction data, and if a problem occurs in this transaction data obtaining process, processing of the transaction after the user triggers the transaction (e.g., clicks Xiu Xiu) is affected, and user experience is hurt.

Figure 4:
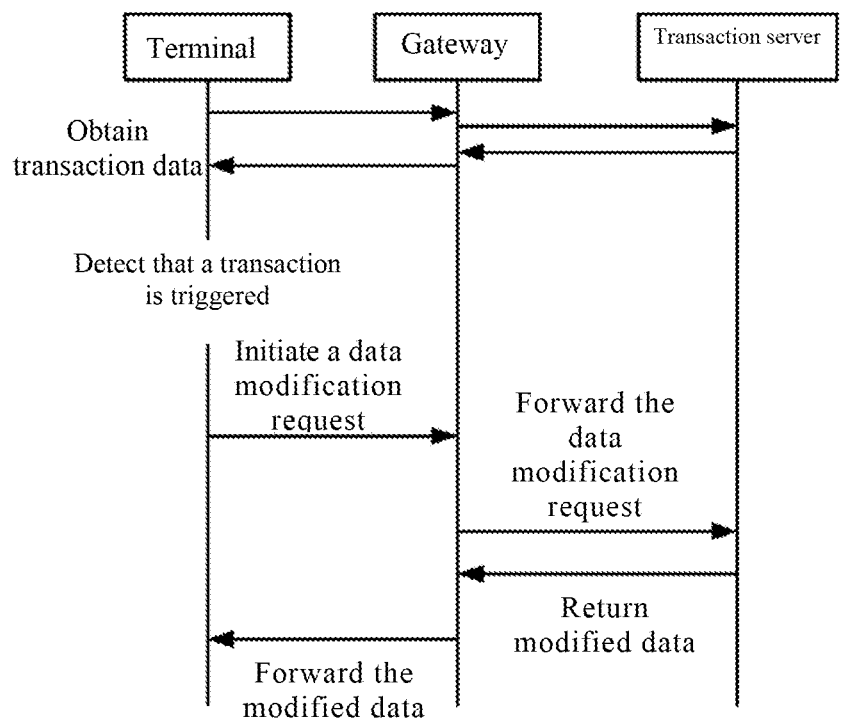
FIG. 4 is a schematic flowchart of another transaction displaying method according to another embodiment of this application.

FIG. 4 shows a transaction displaying method in this embodiment. In the method:

4.1: A terminal pre-obtains transaction data.
4.2: The terminal detects that a transaction is triggered.
4.3: The terminal initiates a data modification request to a gateway.
4.4: The gateway forwards the data modification request to a transaction server to request to modify the data.
4.5: The transaction server returns modified data to the gateway.
4.6: The gateway forwards the modified data to the terminal.

According to the method shown in FIG. 4, after the terminal detects that the transaction is triggered, only the modified data is obtained. If a problem occurs in this modified data obtaining process, because the transaction data of the normally running transaction is obtained, normal running of the triggered transaction is not affected, and user experience is not impacted.

Beneficial Effect

The transaction data configured by the transaction server is obtained; a transaction displaying group is selected from the transaction data when it is detected that the transaction is triggered; a transaction displaying object is determined in the selected transaction displaying group; and the determined transaction displaying object is displayed, so that transaction displaying data is pre-obtained rather than obtained in a displaying process, a high-concurrency problem is not involved, and relatively high requirements on a high-concurrency execution capability of the transaction server are reduced.

Figure 5:
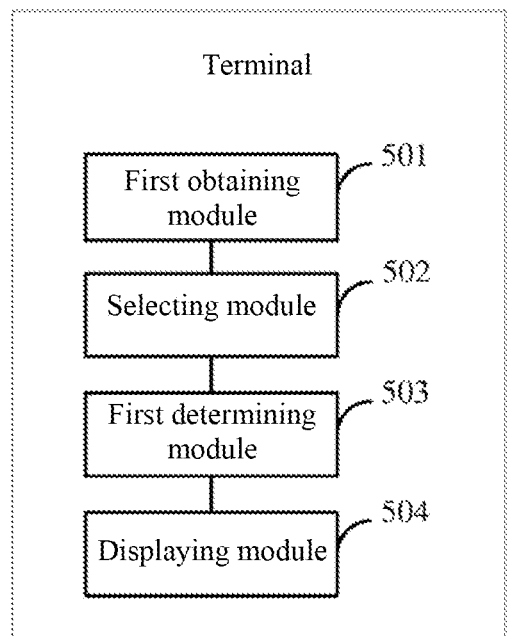
FIG. 5 is a schematic structural diagram of a terminal according to another embodiment of this application.

Based on a same inventive concept, this embodiment provides a terminal. Referring to FIG. 5, the terminal includes:

a first obtaining module 501, configured to obtain transaction data configured by a transaction server, where the transaction data includes at least one transaction displaying group, and any transaction displaying group includes at least one transaction displaying object;

a selecting module 502, configured to select a transaction displaying group from the transaction data obtained by the first obtaining module 501 when it is detected that a transaction is triggered;

a first determining module 503, configured to determine a transaction displaying object in the transaction displaying group selected by the selecting module 502; and a displaying module 504, configured to display the transaction displaying object determined by the first determining module 503.

Optionally, the transaction data further includes group displaying probabilities of all the transaction displaying groups, a sum of the group displaying probabilities being 100%.

Figure 6:
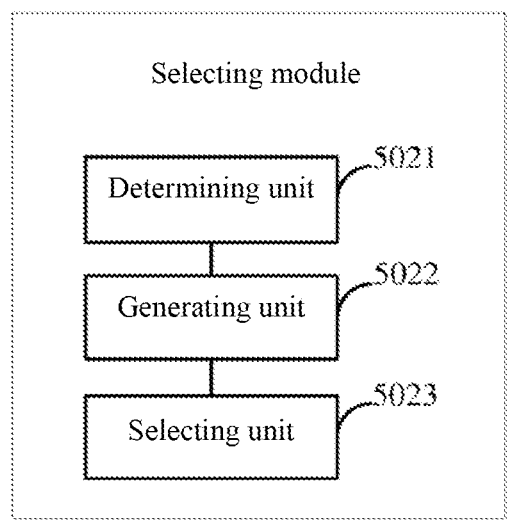
FIG. 6 is a schematic structural diagram of a selecting module according to another embodiment of this application.

Referring to FIG. 6, the selecting module 502 includes:

a determining unit 5021, configured to determine, based on the group displaying probabilities, a group interval corresponding to each of the transaction displaying groups in an interval [0, 100];

a generating unit 5022, configured to generate a first random number, where the first random number is a natural number in [1, 100]; and a selecting unit 5023, configured to determine a group interval including the first random number, and select a transaction displaying group corresponding to the determined group interval.

Optionally, the transaction data further includes object displaying probabilities of all the transaction displaying objects, a sum of the object displaying probabilities in any transaction displaying group being 100%.

Figure 7:
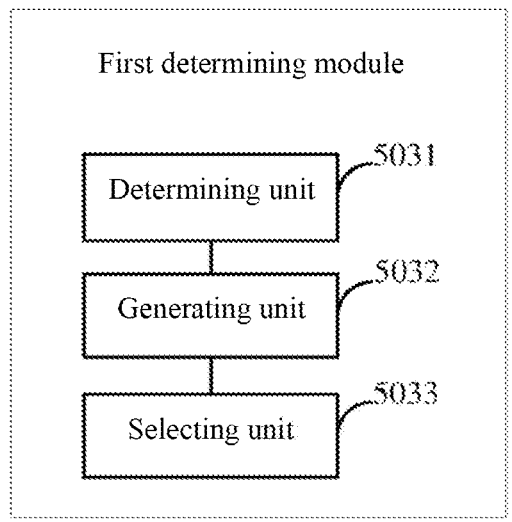
FIG. 7 is a schematic structural diagram of a first determining module according to another embodiment of this application.

Referring to FIG. 7, the first determining module 503 includes:

a determining unit 5031, configured to determine, based on the object displaying probabilities in the selected transaction displaying group, an object interval corresponding to each of the transaction displaying objects in the selected transaction displaying group in an interval [0, 100];

a generating unit 5032, configured to generate a second random number, where the second random number is a natural number in [1, 100]; and a selecting unit 5033, configured to determine an object interval including the second random number, and select a transaction displaying object corresponding to the determined object interval.

Optionally, the transaction data further includes a group identifier of each transaction displaying group.

Figure 8:
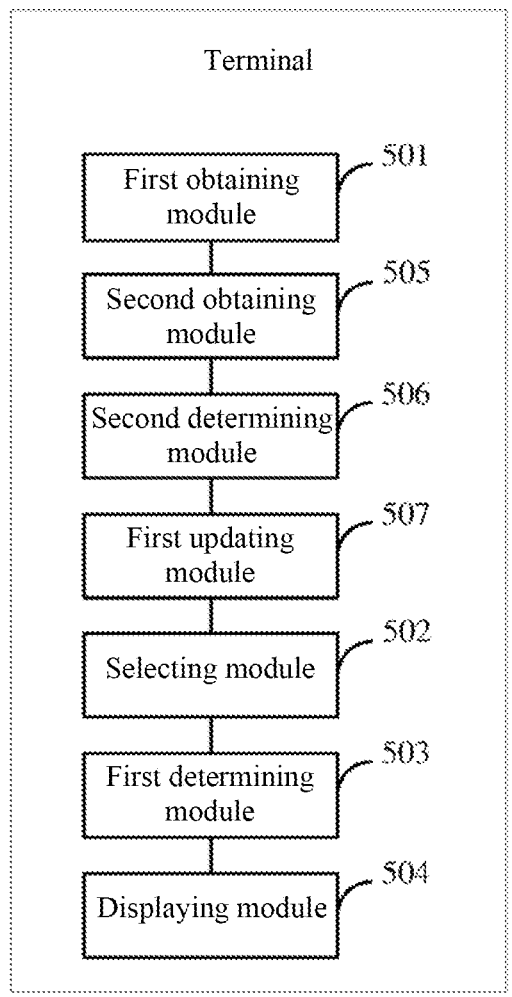
FIG. 8 is a schematic structural diagram of another terminal according to another embodiment of this application.

Referring to FIG. 8, the terminal further includes:

a second obtaining module 505, configured to obtain a group identifier and a group displaying update probability that are configured by the transaction server;

a second determining module 506, configured to determine, in the transaction data, a transaction displaying group corresponding to the group identifier that is configured by the transaction server and that is obtained by the second obtaining module 505; and a first updating module 507, configured to update a displaying probability corresponding to the transaction displaying group determined by the second determining module 506 to the group displaying update probability.

Optionally, the transaction data further includes an object identifier of each transaction displaying object.

Figure 9:
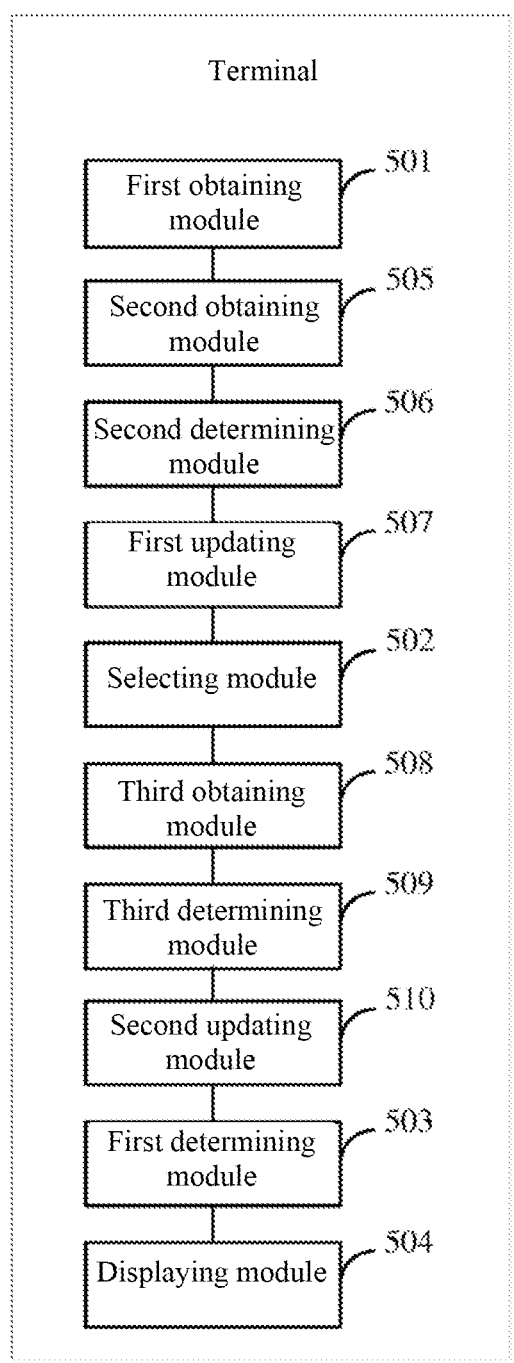
FIG. 9 is a schematic structural diagram of another terminal according to another embodiment of this application.

Referring to FIG. 9, the terminal further includes:

a third obtaining module 508, configured to obtain an object identifier and an object displaying update probability that are configured by the transaction server;

a third determining module 509, configured to determine, in the transaction data, a transaction displaying object corresponding to the object identifier that is configured by the transaction server and that is obtained by the third obtaining module 508; and a second updating module 510, configured to update an object displaying probability corresponding to the transaction displaying object determined by the third determining module 509 to the object displaying update probability.

Optionally, the second obtaining module 505 is configured to obtain a group identifier and a group displaying update probability in a message header of a first HTTP message; and the first HTTP message is sent by a gateway, and the group identifier and the group displaying update probability are configured by the transaction server.

Optionally, the third obtaining module 508 is configured to obtain an object identifier and an object displaying update probability in a message header of a second HTTP message; and the second HTTP message is sent by a gateway, and the object identifier and the object displaying update probability are configured by the transaction server.

Beneficial effects are as follows:

The transaction data configured by the transaction server is obtained; a transaction displaying group is selected from the transaction data when it is detected that the transaction is triggered; a transaction displaying object is determined in the selected transaction displaying group; and the determined transaction displaying object is displayed, so that transaction displaying data is pre-obtained rather than obtained in a displaying process, a high-concurrency problem is not involved, and relatively high requirements on a high-concurrency execution capability of the transaction server are reduced.

Figure 10:
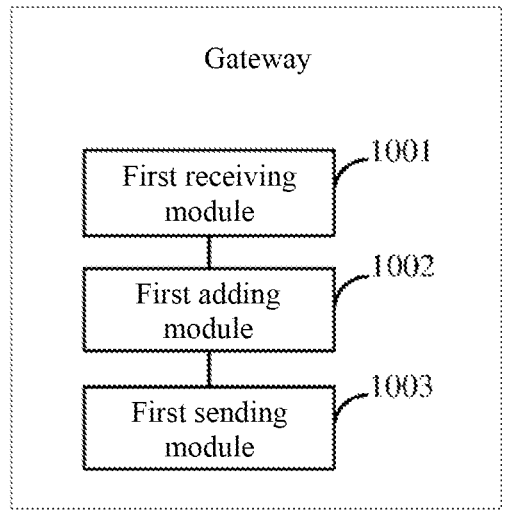
FIG. 10 is a schematic structural diagram of a gateway according to another embodiment of this application.

Based on a same inventive concept, this embodiment provides a gateway. Referring to FIG. 10, the gateway includes:

a first receiving module 1001, configured to receive a group identifier and a group displaying update probability that are configured by a transaction server;

a first adding module 1002, configured to add the group identifier and the group displaying update probability that are received by the first receiving module 1001 to a first message header; and a first sending module 1003, configured to send a message including a message header of a first HTTP message to a terminal, where the first HTTP message is related to a transaction of the terminal.

Figure 11:
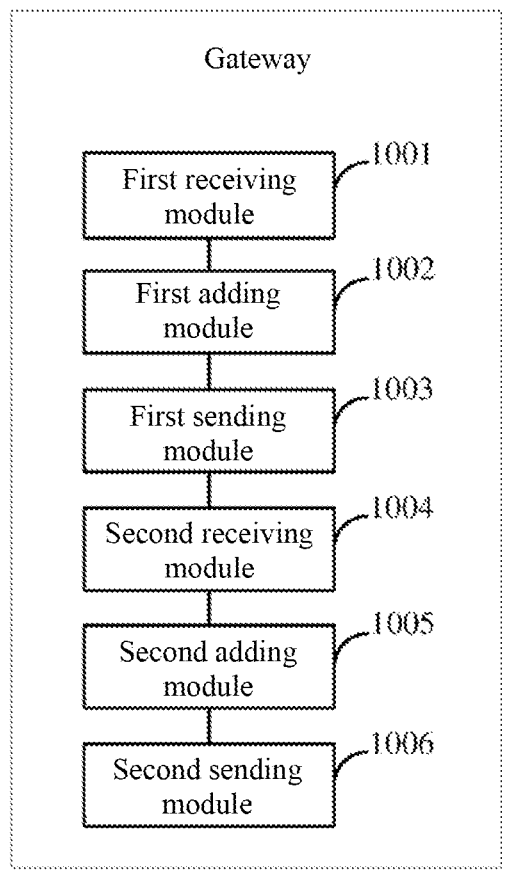
FIG. 11 is a schematic structural diagram of another gateway according to another embodiment of this application.

Referring to FIG. 11, the gateway further includes:

a second receiving module 1004, configured to receive an object identifier and an object displaying update probability that are configured by the transaction server;

a second adding module 1005, configured to add the object identifier and the object displaying update probability that are received by the second receiving module 1004 to a message header of a second HTTP message; and a second sending module 1006, configured to send the second HTTP message to the terminal, where the second HTTP message is related to a transaction of the terminal.

Beneficial effects are as follows:

After modified data configured by the transaction server is received, the received modified data is added to a message header of a message and sent to the terminal, so that traffic consumption in data transmission is reduced, and relatively high requirements on a high-concurrency execution capability of the transaction server are reduced. The modified data is the group identifier and the group displaying update probability, the object identifier and the object displaying update probability, or the group identifier and the group displaying update probability and the object identifier and the object displaying update probability.

Figure 12:
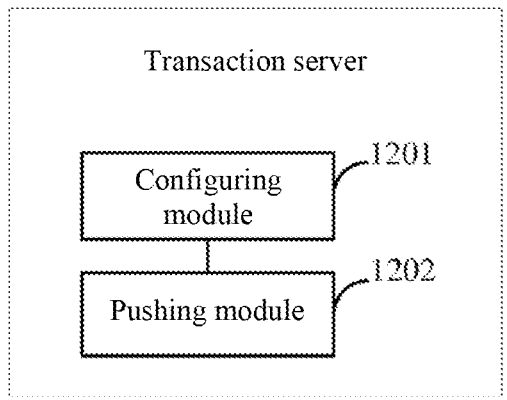
FIG. 12 is a schematic structural diagram of a transaction server according to another embodiment of this application.

Based on a same inventive concept, this embodiment provides a transaction server. Referring to FIG. 12, the transaction server includes:

a configuring module 1201, configured to configure transaction data, where the transaction data includes at least one transaction displaying group, and any transaction displaying group includes at least one transaction displaying object; and a pushing module 1202, configured to push the transaction data configured by the configuring module 1201 to a terminal.

Optionally, the transaction data further includes group displaying probabilities of all the transaction displaying groups, a sum of the group displaying probabilities being 100%.

Optionally, the transaction data further includes object displaying probabilities of all the transaction displaying objects, a sum of the object displaying probabilities in any transaction displaying group being 100%.

Optionally, the transaction data further includes a group identifier of each transaction displaying group.

Figure 13:
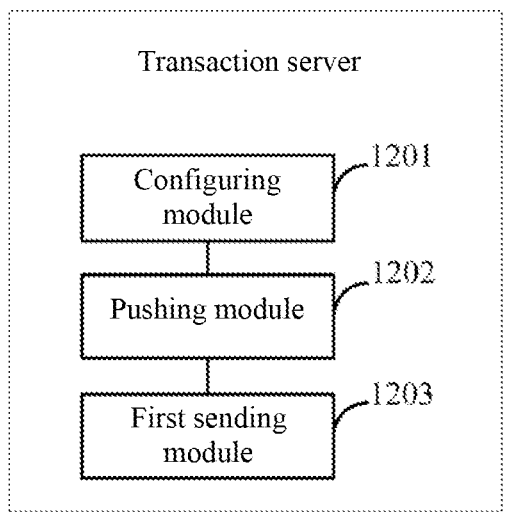
FIG. 13 is a schematic structural diagram of another transaction server according to another embodiment of this application.

Referring to FIG. 13, the transaction server further includes:

a first sending module 1203, configured to send, after a group displaying update probability of a transaction displaying group is obtained, the group identifier and the group displaying update probability of the transaction displaying group to the gateway.

Optionally, the transaction data further includes an object identifier of each transaction displaying object.

Figure 14:
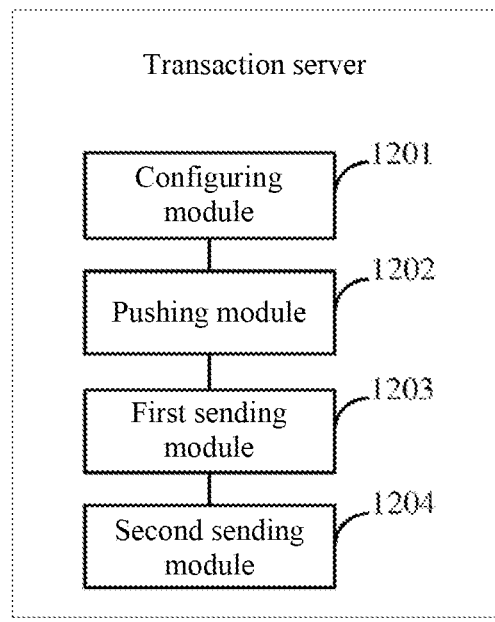
FIG. 14 is a schematic structural diagram of another transaction server according to another embodiment of this application.

Referring to FIG. 14, the transaction server further includes:

a second sending module 1204, configured to send, after an object displaying update probability of the transaction displaying object is obtained, the object identifier and the object displaying update probability of the transaction displaying object to the gateway.

Beneficial effects are as follows:

After the transaction data is configured, the transaction data is pushed to the terminal, so that the terminal selects a transaction displaying group from the obtained transaction data; and a transaction displaying object in the selected transaction displaying group is displayed, so that transaction displaying data is pre-obtained rather than obtained in a displaying process, a high-concurrency problem is not involved, and relatively high requirements on a high-concurrency execution capability of the transaction server are reduced.

Figure 15:
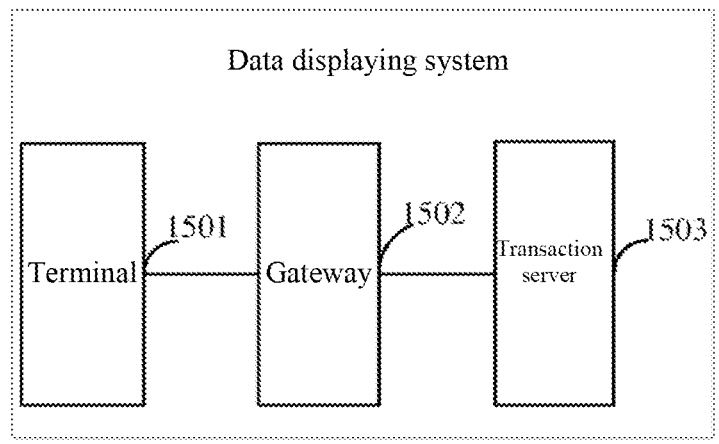
FIG. 15 is a schematic structural diagram of a transaction displaying system according to another embodiment of this application.

Based on a same inventive concept, this embodiment provides a transaction displaying system. Referring to FIG. 15, the system includes: a terminal 1501, a gateway 1502, and a transaction server 1503.

The terminal 1501 is configured to: obtain transaction data configured by the transaction server 1503, where the transaction data includes at least one transaction displaying group, and any transaction displaying group includes at least one transaction displaying object; select a transaction displaying group from the transaction data when it is detected that a transaction is triggered; determine a transaction displaying object in the selected transaction displaying group; and display the determined transaction displaying object.

Optionally, the transaction data further includes group displaying probabilities of all the transaction displaying groups, a sum of the group displaying probabilities being 100%.

The terminal 1501 is configured to determine group intervals corresponding to the transaction displaying groups in an interval [0, 100] according to the group displaying probabilities; generate a first random number, where the first random number is a natural number in [1, 100]; and determine a group interval including the first random number, and select a transaction displaying group corresponding to the determined group interval.

Optionally, the transaction data further includes object displaying probabilities of all the transaction displaying objects, a sum of the object displaying probabilities in any transaction displaying group being 100%.

The terminal 1501 is configured to determine object intervals corresponding to the transaction displaying objects in the selected transaction displaying group in an interval [0, 100] according to all the object displaying probabilities in the selected transaction displaying group; generate a second random number, where the second random number is a natural number in [1, 100]; and determine an object interval including the second random number, and select a transaction displaying object corresponding to the determined object interval.

Optionally, the transaction data further includes a group identifier of each transaction displaying group; and the terminal 1501 is further configured to obtain a group identifier and a group displaying update probability that are configured by the transaction server; and determine, in the transaction data, a transaction displaying group corresponding to the group identifier configured by the transaction server, and update a displaying probability corresponding to the transaction displaying group to the group displaying update probability.

Optionally, the transaction data further includes an object identifier of each transaction displaying object; and the terminal 1501 is further configured to obtain the object identifier and an object displaying update probability that are configured by the transaction server; and determine, in the transaction data, a transaction displaying object corresponding to the object identifier configured by the transaction server, and update an object displaying probability corresponding to the transaction displaying object to the object displaying update probability.

Optionally, the terminal 1501 is configured to obtain a group identifier and a group displaying update probability in a message header of a first HTTP message; and the first HTTP message is sent by a gateway 1502, and the group identifier and the group displaying update probability are configured by the transaction server.

Optionally, the terminal 1501 is configured to obtain an object identifier and an object displaying update probability in a message header of a second HTTP message; and a message of the second message header is sent by a gateway 1502, and the object identifier and the object displaying update probability are configured by the transaction server.

The gateway 1502 is configured to receive the group identifier and the group displaying update probability that are configured by the transaction server 1503; add the group identifier and the group displaying update probability to the message header of the first HTTP message; and send the first HTTP message to the terminal 1501, where the first HTTP message is related to a transaction of the terminal 1501.

Optionally, the gateway 1502 is further configured to receive the object identifier and the object displaying update probability that are configured by the transaction server 1503; add the object identifier and the object displaying update probability to the message header of the second HTTP message; and send the second HTTP message to the terminal 1501, where the second HTTP message is related to a transaction of the terminal 1501.

The transaction server 1503 is configured to: configure transaction data, where the transaction data includes at least one transaction displaying group, and any transaction displaying group includes at least one transaction displaying object; and push the transaction data to the terminal 1501.

Optionally, the transaction data further includes group displaying probabilities of all the transaction displaying groups, a sum of the group displaying probabilities being 100%.

Optionally, the transaction data further includes object displaying probabilities of all the transaction displaying objects, a sum of the object displaying probabilities in any transaction displaying group being 100%.

Optionally, the transaction data further includes a group identifier of each transaction displaying group; and the transaction server 1503 is configured to send, after a group displaying update probability of the transaction displaying group is obtained, the group identifier and the group displaying update probability of the transaction displaying group to the gateway 1502.

Optionally, the transaction data further includes an object identifier of each transaction displaying object; and the transaction server 1503 is further configured to send, after an object displaying update probability of the transaction displaying object is obtained, the object identifier and the object displaying update probability of the transaction displaying object to the gateway 1502.

Beneficial effects are as follows:

The transaction data configured by the transaction server is obtained by the terminal; a transaction displaying group is selected from the transaction data when it is detected that the transaction is triggered; a transaction displaying object is determined in the selected transaction displaying group; and the determined transaction displaying object is displayed, so that transaction displaying data is pre-obtained rather than obtained in a displaying process, a high-concurrency problem is not involved, and relatively high requirements on a high-concurrency execution capability of the transaction server are reduced.

For ease of description, the components of the foregoing apparatus are respectively described as various modules and units divided according to functions. Certainly, during implementation of particular embodiments, the functions of the modules and units may be implemented in one or more pieces of software or hardware.

Persons skilled in the art should understand that the embodiments of the specification may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-readable storage media (including but not limited to a disk memory, a CD-ROM, an optical memory, and the like) that include computer-readable program code.

Embodiments of the specification are described with reference to flowcharts and/or block diagrams of the method, device (system), and the computer program product in the embodiments of the specification. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate a product that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the specification have been described, persons skilled in the art can make changes and modifications to these embodiments once they learn the basic inventive concept. Therefore, the attached claims are intended to be construed as to encompass the preferred embodiments and all changes and modifications falling within the scope of this application.

What is claimed is:

1. A transaction-displaying method, comprising:
   obtaining, by a terminal prior to occurrence of a first triggering event for a transaction, data associated with the transaction from a server, wherein the data comprises:
     data associated with a plurality of displaying groups,
     data associated with a plurality of displaying objects, wherein each of the displaying groups comprises one or more displaying objects among the plurality of displaying objects and each of the displaying objects comprises displayable content,
     a plurality of group identifiers and a plurality of group displaying probabilities respectively associated with the displaying groups, and
     a plurality of object identifiers and a plurality of object displaying probabilities respectively associated with the displaying objects;
   subsequent to the obtaining the data associated with the transaction, detecting, by the terminal, the occurrence of the first triggering event, wherein the first triggering event comprises a user interface being opened;
   sending, by the terminal via a gateway to the server in response to detecting the occurrence of the first triggering event, a data modification request;
   receiving, by the terminal from the server via the gateway, modified data, wherein the modified data comprises:
     a first Hyper Text Transfer Protocol (HTTP) message comprising a header that comprises a group identifier of at least one displaying group of the plurality of displaying groups and a group displaying update probability associated with the at least one displaying group, and
     a second HTTP message comprising a header that comprises an object identifier of at least one displaying object of the plurality of displaying objects and an object displaying update probability associated with the at least one displaying object;
   updating, by the terminal, the group displaying probabilities and the object displaying probabilities based on the modified data;
   selecting, by the terminal responsive to the detecting, a displaying group from the data associated with the transaction based on the updated group displaying probabilities;
   selecting, by the terminal, a displaying object in the selected displaying group for display based on the updated object displaying probabilities, wherein the selecting the displaying object comprises:
  determining an object interval corresponding to each of the one or more displaying objects in the selected displaying group based on the updated object displaying probabilities;
  generating a first random number; and
  determining that the first random number falls within an object interval corresponding to the selected displaying object;
displaying, by the terminal, a first displaying content associated with a first state of the selected displaying object;
detecting, by the terminal, a second triggering event in the user interface; and
displaying, by the terminal in response to detecting the second triggering event, a second displaying content associated with a second state of the selected displaying object, wherein the second displaying content is different from the first displaying content.

2. The method of claim 1, wherein the selecting a displaying group from the data based on the updated group displaying probabilities comprises:
  determining a group interval corresponding to each of the displaying groups based on the updated group displaying probabilities;
  generating a second random number; and
  determining that the second random number falls within a group interval corresponding to the selected displaying group.

3. The method of claim 1, wherein updating the group displaying probabilities and the object displaying probabilities based on the modified data comprises:
  identifying, from the plurality of displaying groups, the at least one displaying group based on the group identifier of the at least one displaying group in the first HTTP message; and
  updating the group displaying probability corresponding to the identified at least one displaying group to be the group displaying update probability.

4. The method of claim 1, wherein updating the group displaying probabilities and the object displaying probabilities based on the modified data comprises:
  identifying, from the plurality of displaying objects, the at least one displaying object based on the object identifier of the at least one displaying object in the second HTTP message; and
  updating the object displaying probability corresponding to the identified at least one displaying object to be the object displaying update probability.

5. A non-transitory computer-readable storage medium associated with a terminal, configured with instructions executable by one or more processors to cause the one or more processors to perform operations comprising:
  obtaining, prior to occurrence of a first triggering event for a transaction, data associated with the transaction from a server, wherein the data comprises:
    data associated with a plurality of displaying groups,
    data associated with a plurality of displaying objects, wherein each of the displaying groups comprises one or more displaying objects among the plurality of displaying objects and each of the displaying objects comprises displayable content,
    a plurality of group identifiers and a plurality of group displaying probabilities respectively associated with the displaying groups, and
    a plurality of object identifiers and a plurality of object displaying probabilities respectively associated with the displaying objects;
  subsequent to the obtaining the data associated with the transaction, detecting the occurrence of the first triggering event, wherein the first triggering event comprises a user interface being opened;
  sending, via a gateway to the server in response to detecting the occurrence of the first triggering event, a data modification request;
  receiving, from the server via the gateway, modified data, wherein the modified data comprises:
    a first Hyper Text Transfer Protocol (HTTP) message comprising a header that comprises a group identifier of at least one group of the plurality of displaying groups and a group displaying update probability associated with the at least one group, and
    a second HTTP message comprising a header that comprises an object identifier of at least one displaying object of the plurality of displaying objects and an object displaying update probability associated with the at least one displaying object;
  updating the group displaying probabilities and the object displaying probabilities based on the modified data;
  selecting, responsive to the detecting, a displaying group from the data associated with the transaction based on the updated group displaying probabilities;
  selecting a displaying object in the selected displaying group for display based on the updated object displaying probabilities, wherein the selecting the displaying object comprises:
    determining an object interval corresponding to each of the one or more displaying objects in the selected displaying group based on the updated object displaying probabilities;
    generating a first random number; and
    determining that the first random number falls within an object interval corresponding to the selected displaying object;
  displaying a first displaying content associated with a first state of the selected displaying object;
  detecting a second triggering event in the user interface; and
  displaying, in response to detecting the second triggering event, a second displaying content associated with a second state of the selected displaying object, wherein the second displaying content is different from the first displaying content.

6. The non-transitory computer-readable storage medium of claim 5, wherein the selecting a displaying group from the data based on the updated group displaying probabilities comprises:
  determining a group interval corresponding to each of the displaying groups based on the updated group displaying probabilities;
  generating a second random number; and
  determining that the second random number falls within a group interval corresponding to the selected displaying group.

7. The non-transitory computer-readable storage medium of claim 5, wherein updating the group displaying probabilities and the object displaying probabilities based on the modified data comprises:
  identifying, from the plurality of displaying groups, the at least one displaying group based on the group identifier of the at least one displaying group in the first HTTP message; and updating the group displaying probability corresponding to the identified at least one displaying group to be the group displaying update probability.

8. The non-transitory computer-readable storage medium of claim 5, wherein updating the group displaying probabilities and the object displaying probabilities based on the modified data comprises:
identifying, from the plurality of displaying objects, the at least one displaying object based on the object identifier of the at least one displaying object in the second HTTP message; and
updating the object displaying probability corresponding to the identified at least one displaying object to be the object displaying update probability.

9. A system associated with a terminal, comprising a processor and a non-transitory computer-readable storage medium storing instructions executable by the processor to cause the system to perform operations comprising:
obtaining, prior to occurrence of a first triggering event for a transaction, data associated with the transaction from a server, wherein the data comprises:
data associated with a plurality of displaying groups,
data associated with a plurality of displaying objects, wherein each of the displaying groups comprises one or more displaying objects among the plurality of displaying objects and each of the displaying objects comprises displayable content,
a plurality of group identifiers and a plurality of group displaying probabilities respectively associated with the displaying groups, and
a plurality of object identifiers and a plurality of object displaying probabilities respectively associated with the displaying objects;
subsequent to the obtaining the data associated with the transaction, detecting the occurrence of the first triggering event, wherein the first triggering event comprises a user interface being opened;
sending, via a gateway to the server in response to detecting the occurrence of the first triggering event, a data modification request;
receiving, from the server via the gateway, modified data, wherein the modified data comprises:
a first Hyper Text Transfer Protocol (HTTP) message comprising a header that comprises a group identifier of at least one group of the plurality of displaying groups and a group displaying update probability associated with the at least one group, and
a second HTTP message comprising a header that comprises an object identifier of at least one displaying object of the plurality of displaying objects and an object displaying update probability associated with the at least one displaying object;
updating the group displaying probabilities and the object displaying probabilities based on the modified data;
selecting, responsive to the detecting, a displaying group from the data associated with the transaction based on the updated group displaying probabilities;
selecting a displaying object in the selected displaying group for display based on the updated object displaying probabilities, wherein the selecting the displaying object comprises:
determining an object interval corresponding to each of the one or more displaying objects in the selected displaying group based on the updated object displaying probabilities;
generating a first random number; and
determining that the first random number falls within an object interval corresponding to the selected displaying object;
displaying a first displaying content associated with a first state of the selected displaying object;
detecting a second triggering event in the user interface; and
displaying, in response to detecting the second triggering event, a second displaying content associated with a second state of the selected displaying object, wherein the second displaying content is different from the first displaying content.

10. The system of claim 9, wherein the selecting a displaying group from the data based on the updated group displaying probabilities comprises:
determining a group interval corresponding to each of the displaying groups based on the updated group displaying probabilities;
generating a second random number; and
determining that the second random number falls within a group interval corresponding to the selected displaying group.

11. The system of claim 9, wherein updating the group displaying probabilities and the object displaying probabilities based on the modified data comprises:
identifying, from the plurality of displaying groups, the at least one displaying group based on the group identifier of the at least one displaying group in the first HTTP message; and
updating the group displaying probability corresponding to the identified at least one displaying group to be the group displaying update probability.

12. The system of claim 9, wherein updating the group displaying probabilities and the object displaying probabilities based on the modified data comprises:
identifying, from the plurality of displaying objects, the at least one displaying object based on the object identifier of the at least one displaying object in the second HTTP message; and
updating the object displaying probability corresponding to the identified at least one displaying object to be the object displaying update probability.

* * * * *